US011238058B2

(12) United States Patent
Najork et al.

(10) Patent No.: US 11,238,058 B2
(45) Date of Patent: Feb. 1, 2022

(54) SEARCH AND RETRIEVAL OF STRUCTURED INFORMATION CARDS

(71) Applicant: Google LLC, Mountain View, CA (US)

(72) Inventors: Marc Alexander Najork, Palo Alto, CA (US); Sujith Ravi, Santa Clara, CA (US); Michael Bendersky, Sunnyvale, CA (US); Peter Shao-sen Young, Mountain View, CA (US); Timothy Youngjin Sohn, Los Altos, CA (US); Mingyang Zhang, Sunnyvale, CA (US); Thomas Nelson, Santa Cruz, CA (US); Xuanhui Wang, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/086,564

(22) Filed: Nov. 2, 2020

(65) Prior Publication Data

US 2021/0049165 A1 Feb. 18, 2021

Related U.S. Application Data

(63) Continuation of application No. 15/334,608, filed on Oct. 26, 2016, now Pat. No. 10,824,630.

(51) Int. Cl.
*G06F 16/248* (2019.01)
*G06F 16/2455* (2019.01)
(Continued)

(52) U.S. Cl.
CPC ...... *G06F 16/248* (2019.01); *G06F 16/24565* (2019.01); *G06F 16/38* (2019.01); *G06F 16/951* (2019.01)

(58) Field of Classification Search
None
See application file for complete search history.

(56) References Cited

U.S. PATENT DOCUMENTS 7,603,350 B1 10/2009 Guha
8,433,705 B1 * 4/2013 Dredze ............ G06F 16/24578
707/723

(Continued)

FOREIGN PATENT DOCUMENTS

CA 2844065 2/2013
CN 102163217 8/2011
(Continued)

OTHER PUBLICATIONS

Chinese Patent Office; First Office Action issued in Application No. 20111019617.8; 20 pages; dated Aug. 2, 2021.
(Continued)

*Primary Examiner* — Christopher J Raab
(74) *Attorney, Agent, or Firm* — Middleton Reutlinger

(57) ABSTRACT

Methods, systems, apparatus, including computer programs encoded on computer storage medium, to facilitate identification of additional trigger-terms for a structured information card. In one aspect, the method includes actions of accessing data associated with a template for presenting structured information, wherein the accessed data references (i) a label term and (ii) a value. Other actions may include obtaining a candidate label term, identifying one or more entities that are associated with the label term, identifying one or more of the entities that are associated with the candidate label term, and for each particular entity of the one or more entities that are associated with the candidate label term, associating, with the candidate label term, (i) a label term that is associated with the particular entity, and (ii) the value associated with the label term.

17 Claims, 4 Drawing Sheets

(51) Int. Cl.
*G06F 16/951* (2019.01)
*G06F 16/38* (2019.01)

(56) References Cited

U.S. PATENT DOCUMENTS

| | | |
|---|---|---|
| 8,819,006 B1 | 8/2014 | Chechik et al. |
| 9,268,820 B2 | 2/2016 | Henry |
| 2011/0314011 A1 | 12/2011 | Buehrer et al. |
| 2012/0130978 A1 | 5/2012 | Li et al. |
| 2013/0110628 A1 | 5/2013 | Yeo et al. |
| 2013/0110825 A1 | 5/2013 | Henry |
| 2014/0344249 A1* | 11/2014 | Magistrado .......... G06Q 10/107 707/722 |
| 2015/0039462 A1 | 2/2015 | Shastry et al. |
| 2015/0039467 A1 | 2/2015 | Kothari et al. |
| 2015/0039647 A1* | 2/2015 | Chan .................. G06F 16/9535 707/769 |
| 2015/0186474 A1* | 7/2015 | Angel ............... G06F 16/90335 707/723 |
| 2015/0293977 A1 | 10/2015 | Perl et al. |
| 2016/0048875 A1 | 2/2016 | Perl et al. |
| 2016/0210354 A1 | 7/2016 | Henry |
| 2016/0224621 A1 | 8/2016 | Bousquet et al. |

FOREIGN PATENT DOCUMENTS

| | | |
|---|---|---|
| CN | 102625936 | 8/2012 |
| CN | 103823857 | 5/2014 |
| CN | 104011716 | 8/2014 |
| EP | 2740053 A1 | 6/2014 |
| EP | 2740053 A4 | 4/2015 |
| WO | 2013020084 | 2/2013 |

OTHER PUBLICATIONS

PCT International Preliminary Report on Patentability in International Application PCT/US2017/057577 dated May 9, 2019. 9 pages.
International Search Report and Written Opinion issued in International Application No. PCT/US2017/057577 dated Feb. 12, 2018. 14 pages.
European Patent Office; Communication Pursuant to Article 94(3)EPC; 6 pages; dated Feb. 11, 2021.

\* cited by examiner

SEARCH AND RETRIEVAL OF STRUCTURED INFORMATION CARDS

BACKGROUND

Search queries can be used to identify resources (e.g., web pages, images, text documents, electronic mail documents, multimedia content, etc.) that are relevant to a user's needs and to present information about the resources in a manner that is most useful to the user. A computer system may receive a search query, process the search query, identify results that are relevant to the search query, and return a set of search results in response to a user submitted query.

SUMMARY

In some implementations, a card trigger-term identification unit is provided that can identify additional trigger-terms for a structured information card. The card trigger-term identification unit allows the grammar of one or more structured information cards to be tuned, over time, by evaluating candidate terms for potential inclusion in the grammar of a structured information card. For example, assume the grammar for a "Movie" structured information card includes the terms "movie time," "movie ticket confirmation," and "ticket confirmation number." The card trigger-term identification unit may analyze the terms associated with the grammar of the "Movie" structured information card and one or candidate queries, and identify an additional trigger-term for the "Movie" structured information card such as the trigger-term "movie ticket." Accordingly, subsequent queries that are received that include the terms such as "movie time", "movie ticket," or both will trigger the display of a "Movie" structured information card in response to such queries.

According to one implementation, the subject matter of this specification may be embodied in a method to facilitate identification of additional trigger-terms for a structured information card. The method may include the actions of accessing data associated with a template for presenting structured information in response to a search query, wherein the accessed data references (i) one or more label terms that, when included in the search query, triggers the structured information to be presented according to the template, and (ii) for each of the one or more label terms, a value, obtaining a candidate label term that is not already associated with the template for presenting the structured information. For each of the one or more label terms, identifying one or more entities that are associated with the label term, identifying one or more of the entities that are associated with the candidate label term. For each of the one or more entities that are associated with the candidate label term, associating, with the candidate label term, (i) one or more of the label terms that are associated with the entity, and (ii) for each of the one or more of the label terms that are associated with the entity, the value associated with the label term, and upon subsequent receipt of a search query that includes the candidate label term, using the one or more values associated with the candidate label term to determine whether to trigger the structured information to be presented according to the template.

Other versions include corresponding systems, apparatus, and computer programs to perform the actions of methods, encoded on computer storage devices.

These and other versions may optionally include one or more of the following features. For instance, in some implementations, the one or more label terms correspond to one or more parameters of a search query.

In some implementations, the value is indicative of a number of times the search query has been used to trigger presentation of the structured information.

In some implementations, obtaining a candidate label term that is not already associated with the template for presenting the structured information may include identifying one or more query terms from a query log.

In some implementations, using the one or more values associated with the candidate label term to determine whether to trigger the structured information to be presented according to the template may include aggregating the one or more values that are associated with the candidate label term, determining whether the aggregated value satisfies a predetermined threshold, and in response to determining that the aggregated value satisfies the predetermined threshold, determining that the search query including the candidate label term will trigger the presentation of the structured information.

In some implementations, using the one or more values associated with the candidate label term to determine whether to trigger the structured information to be presented according to the template may include aggregating the one or more values that are associated with the candidate label term, determining whether the aggregated value satisfies a predetermined threshold, and in response to determining that the aggregated value exceeds the predetermined threshold, determining that the search query including the candidate label term will not trigger the presentation of the structured information.

In some implementations, the method may further include adjusting the one or more values associated with candidate labels based on the candidate label's similarity to the one or more label terms.

These and other versions each may optionally include one or more of the following features.

The details of these, and other, implementations are set forth in the accompanying drawings and the description below. Other features and advantages will be apparent from the description and drawings, and from the claims.

DETAILED DESCRIPTION

Figure 1:
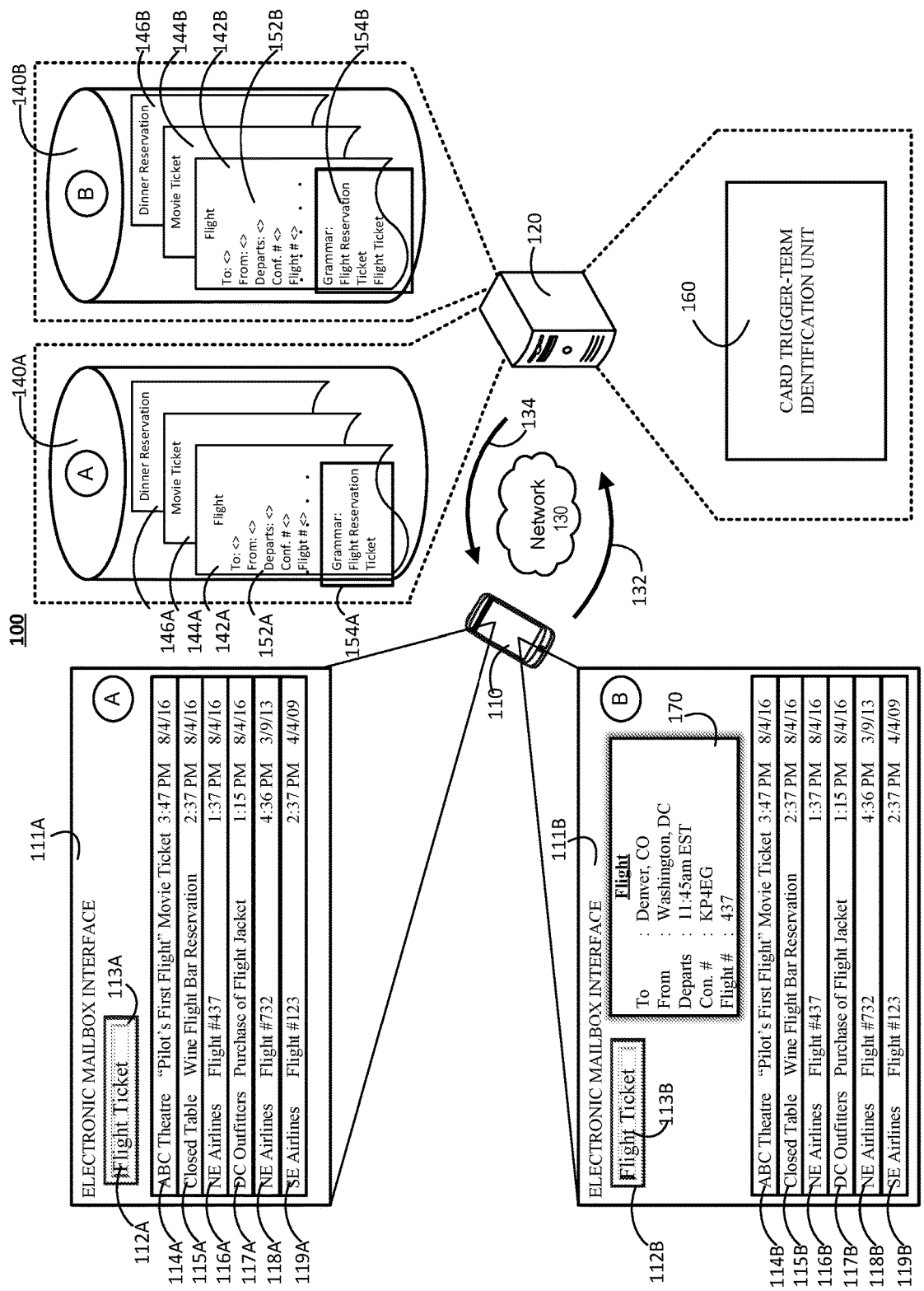
FIG. 1 is a contextual diagram of an example of a system for identifying an additional trigger-terms for a structured information card.

FIG. 1 is a contextual diagram of an example of a system 100 for identifying additional trigger-terms for a structured information card 170. The system 100 includes a user device 110, a server 120, and a network 130.

In the example of FIG. 1, at stage A, assume the user of user device 110 is standing at an airport ticket counter in advance of the user's flight #437 to Denver, Colo. To check the user's bags, and obtain a boarding pass, the user needs to provide the flight confirmation number for the user's upcoming flight. In response to a request for the user's flight confirmation number from an airline employee, the user of user device 110 may seek to obtain a confirmation email from the airline that included the user's flight confirmation number. To obtain the confirmation email, the user inputs the search query 112A that includes the term "Flight Ticket" into a search box 113A of user interface 111A.

After receiving the search query 112A, the user device 110 may transmit 132 the search query 112A to a server 120 via a network 130 that includes one or more of a LAN, a WAN, a cellular network, the Internet, or the like. The server 120 may process the search query 112A, identify one or more search results that are responsive to the search query 112A term "Flight Ticket," and then return 134 the search results to the user device 110. The search results may be received by the user device 110, and provided for display using the interface 111A of the user device 110. In this example, the search results may include references to email documents such as references 114A, 115A, 116A, 117A, 118A, 119A. The references may include a link that, when selected, provides the email document associated with the link for display on the user device 110. Each respective reference may include text such as the name of the email sender, the subject line of the email, the time the email was received, and the date the email was received.

The search results identified based on the search query term "Flight Ticket" may include emails from a variety of different senders. For instance, the search results may include a reference 114A to an email from a movie theater "ABC Theatre" related to the user's purchase of a movie ticket to see "Pilot's First Flight." The search results may also include a reference 115A to an email from a restaurant reservation service "Closed Table" for a reservation at the "Wine Flight Bar." The search results may also include a reference 117A to an email that includes an order confirmation from "DC Outfitters" for the purchase of a "Flight Jacket." The search results may also include multiple references 116A, 118A, 119A, to emails that are associated with airline ticket purchase confirmations from an airline such as "NE Airlines," "SE Airlines," or the like. For example, one particular reference 116A references a confirmation email that the user received after the purchase of an airline ticket from "NE Airlines" for "Flight 437."

However, given the set of search results provided in response to the search query 112A, it may be rather time consuming to obtain the user's flight confirmation number. This is because the user must read the sender and subject line of each reference to each respective email that is responsive to the user's search. For instance, it is not until the user reads the sender and subject line of references 114A, 115A, and 116A that the user even identifies the correct email that includes the flight confirmation number. Then, the user of the user device 110 must select the reference 116A to request the email document associated with the reference 116A. Finally, after the email document corresponding to the reference 116A is selected, the email document with the flight confirmation number for the user's upcoming Flight #437 is returned. Though the user was able to obtain the user's confirmation number, the process was inefficient. In addition, the process may not go smoothly for a number of reasons such as pressure on the user because of a long line of unruly passengers behind the user at the ticket counter, slow cellular data signals due to poor reception in the airport terminal, or the like.

The system 100 offers solutions to improve the user's retrieval of information from the user's email inbox. For instance, at stage A, the system 100 provides multiple structured information cards 142A, 144A, 146A that are stored in a structured information card storage unit 140A. Each structured information card includes a template 152A and a grammar 154A. The template 152A of the structured information card includes one or more predetermined fields that can be populated with information from an email document in response to a particular search query. For example, the structured information storage unit 140A may include a structured information card 142A for "Flight" information. The structured information card 142A for "Flight" information may include a "To" field, a "From" field, a "Departs" field, a "Conf. #" field, and a "Flight #" field.

The grammar 154A may include one or more trigger-terms that are associated with the card 142A. A trigger-term may include a one or more terms that, when detected by the server 120 as being included in a search query, trigger the retrieval, population, and display of the structured information card associated with the trigger-term. For example, in response to the query that includes the term "flight reservation," the "Flight" structured information card 142A may be obtained, populated with data from the most recent email that is associated with an upcoming flight, and provided for display via a user interface such as user interface 111A. However, the "Flight" structured information card 142A was not triggered in response to the search query 112A with search term "Flight Ticket" because the search term "Flight Ticket" is not included in the "Flight" structured information card's 142A grammar 154A at stage A.

The server 120 can use the card trigger-term identification unit 160 to identify one or more additional terms that can be used to trigger the "Flight" structured information card 142A. The additional terms may be based on, for example, one or more queries received from a search box associated with a user interface displayed by a user device such as search box 112A of user interface 111A. In some implementations, the card trigger-term identification unit 160 can obtain a query term from a log of received query terms, determine if the query term is related to one or more other terms in a structured information card's grammar, and in some instances, add the query term to the structured information card's grammar. For instance, the card trigger-term identification unit 160 may determine that the term "Flight Ticket" should be added to the grammar 154A of the "Flight" structured information card. Adding the term "Flight Ticket" to the grammar of the "Flight" structured information card results in an updated structured information storage unit 140B at stage B.

At stage B, the user of the same user device 110 can access a user interface 111B at a later point in time. The user interface 111B may be the same user interface as user interface 111A. The user may input a search query 112B that includes the term "Flight Ticket" into the search box 113B. In a manner similar to that described with respect to stage A, the user device 110 may transmit 132 the search query 112B to a server 120 via a network 130 that includes one or more of a LAN, a WAN, a cellular network, the Internet, or the like. The server 120 may process the search query 112B, identify one or more search results that are responsive to the search query 112B "Flight Ticket," and then return 134 the search results to the user device 110. The search results may be received by the user device 110, and provided for display using the interface 112B of the user device 110. In this example, the search results may include references to email documents such as references 114B, 115B, 116B, 117B, 118B, 119B. In this example, the search results returned to user device 110, and displayed on user interface 111B are the same references to the same email documents as the references 114A, 115A, 116A, 117A, 118A, 119A provided for display via user interface 111A.

At stage B, however, the user interface 111B also includes a structured information card 170. A structured information card 170 may include, for example, a display that includes one or more fields that have been populated with data extracted from a resource responsive to the search query 112B. The structured information card 170 may be obtained, populated, and provided for display via user interface 111B because the grammar of the structured information card 142B stored in the structured information card storage unit 140B now includes the term "Flight Ticket." The term "Flight Ticket" was added to the grammar of the "Flight" structured information card 142B based on the card trigger-term identification unit's 160 analysis of the existing terms included within the grammar of one or more structured information card 142A, one or more identified relationships between existing terms included within the grammar of the structured information card 142A, and one or more identified relationships between the aforementioned grammar terms and one or more queries previously submitted via the search box 113A.

The particular structured information card 170 obtained and displayed may be based on the query terms submitted through the search box 113B. For example, the server 120 may select a particular structured information card 170 for display via the user interface 111B based on a determination that the search query term such as "Flight Ticket" matches one or more grammar terms associated with the particular structured information card 170. The server 120 may populate the obtained structured information card with the contents of the highest ranked search result that includes information requested by the fields of the structured information card template 152B. In some implementations, the highest ranked search results may be the most recent email document that includes information requested by the fields of the structured information card template 152B.

The structured information card 170 provides the advantage of displaying relevant information related to the user's upcoming flight without requiring the user to read the data associated with each reference 114B, 115B, 116B, 117B, 118B, 119B returned as a search results by the server 120. Moreover, the structured information card 170 displays the user's flight destination (e.g., Denver, Co), the user's flight origin (e.g., Washington, D.C.), the user's flight departure time (e.g., 11:45 am EST), the user's flight confirmation number (e.g., KP4EG), and the user's flight number (e.g., 437). Accordingly, the user does not need to open the email that includes information about the user's upcoming flight because the necessary information associated with the user's upcoming flight is included within the structured information card 170. Accordingly, the user of user device 110 that is standing at the ticket counter can quickly search the user's email, obtain the user's flight confirmation number from the structured information card, and provide the flight confirmation number to the airline representative in an efficient manner.

The example of a system 100 that uses a card trigger-term identification unit 160 to identify additional terms that can be added to the grammar of a structured information card is directed towards a "Flight" structured information card 142B. However, the present disclosure should not be so limited. Instead, the card trigger-term identification unit 160 can be used to identify additional grammar terms for any type of structured information card such as a "Movie Ticket" structured information card 144B, a "Dinner Reservation" structured information card 146B, or the like. Other examples of structured information cards may include, for example, hotel reservation structured information cards, vehicle rental structured information cards, device rental structured information cards, or the like. Moreover, any type of structured information cards may be used where the structured information card can be uniquely identified using a set of one or more grammar terms.

Figure 2A:
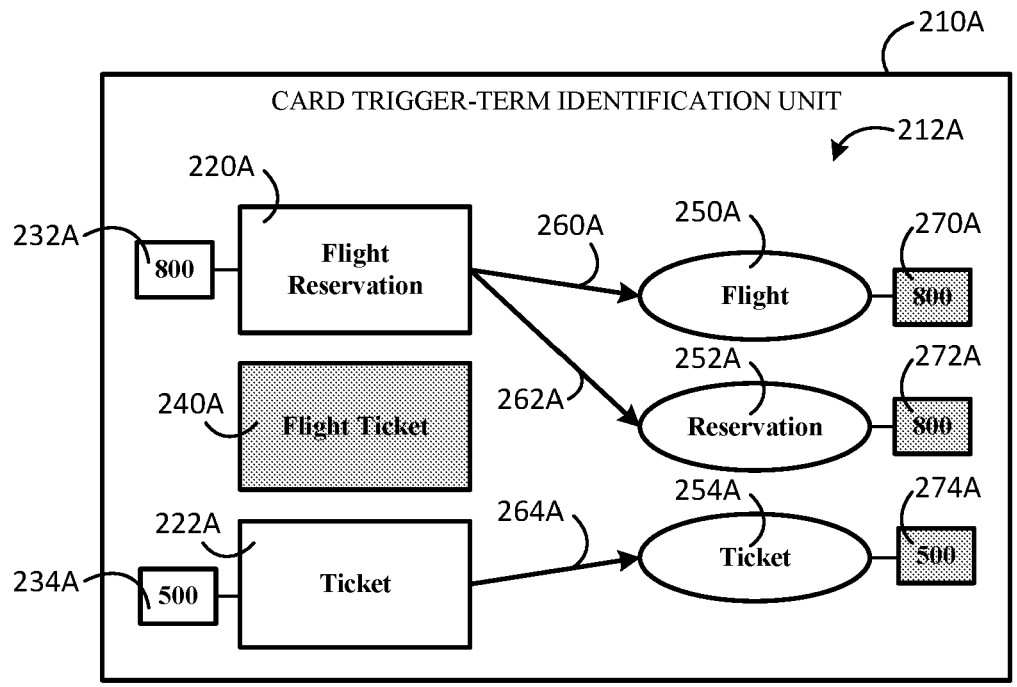
FIG. 2A is a contextual diagram of an example of aspects of a card trigger-term identification unit.

FIG. 2A is a contextual diagram of an example of aspects of a card trigger-term identification unit with reference to a card trigger-term identification unit 210A. The term "unit" is used broadly by this specification to refer to a software based system or subsystem that can perform one or more specific functions. Generally, a unit will be implemented as one or more software modules or components, installed on one or more computers in one or more locations. In other cases, however, multiple units can be installed on the same computer or computers.

A card trigger-term identification unit 210A is used to analyze existing terms associated with the grammar of one or more structured information cards. The terms associated with the grammar of one or more structure information cards include one or more terms that, when received in a search query, trigger the display of a particular structured information card.

In some implementations, analyzing existing terms associated with the grammar of one or more information cards may include generating a graph structure 212A. The graph structure 212A may include one or more query nodes 220A, 222A that are each associated with a particular grammar term that triggers the selection, population, and display of a particular structured information card. Each query node 220A, 222A may be associated with a respective label term. For example, the query node 220A is associated with the label term "Flight Reservation" and the query node 222A is associated with the label term "Ticket." The label terms used to build the graph may be obtained from the structured information card storage unit, a query log, or the like.

Each of the query nodes 220A, 222A may be associated with a particular value. For example, the query node 220A is associated with the value 232A "800" and the query node 222A is associated with the value 234A "500." The respective values 232A, 234A may include a particular weight that is associated with the label term of each respective query node. In some implementations, the value may include a count of a number of times that a particular label term was used to trigger the selection, population, and display of a particular structured information card. For example, the value 232A "800" may indicate that the label term "Flight Reservation" was used to trigger selection, population, and display of the "Flight" structured information card 124A 800 times. Though the value may be indicative of the number of times a particular label term was used to trigger selection, population, and display of a particular structured information card, the present disclosure need not be so limited. For instance, in some implementations, the values 232A, 234A may be scaled based on the importance of the label term.

The graph structure 212A may also include one or more entity nodes 250A, 252A, 254A. The entity nodes 250A, 252A, 254A may include an item of data that is indicative of a relationship between the respective label terms of one or more nodes 220A, 222A. In some implementations, the relationship may include a semantic relationship associated with the label terms. For example, each entity nodes 250A, 252A, 254A may each include one or more terms selected from a shared set of all the label terms associated with the query nodes 220A, 222A. For instance, the set of shared words may include "Flight," "Reservation," and "Ticket," which were derived from the set of query node label terms "Flight Reservation" and "Ticket." Accordingly, in one implementation, each particular term from the set of shared terms may be assigned to a particular entity node. For example, the entity node 250A may be assigned the word "Flight," the entity node 252A may be assigned the word "Reservation," and the entity node 254A may be assigned the word "Ticket." Though this example describes entity nodes that are generated based on a set of shared words, the present disclosure need not be so limited. For instance, the entity nodes may include other item(s) of data that are representative of another relationship between the label terms of nodes 220A, 222A. For instance, each respective entity node may be indicative of a particular email that is retrieved in response to the execution of a query that includes one or more label terms. Alternatively, or in addition, a respective entity node may be indicative of a particular web address, webpage, URL, or the like that is returned in response to a query that includes one or more label terms.

The card trigger-term identification unit 210A associates the values 232A, 234A that correspond to each query node 220A, 222A with each entity node 250A, 252A, 254A with which each respective query node 220A, 222A, is associated. A query node 220A, 222A is associated with an entity node 250A, 252A, 254A if the entity node 250A, 252A, 254A includes an item of data that was derived from the label terms associated with a particular query node 220A, 222A. For example, the query node 220A is associated with the entity node 250A that includes the term "Flight" because the term "Flight" was derived from the label term "Flight Reservation" that is associated with the query node 220A. Similarly, the query node 220A is also associated with the entity node 252A that includes the term "Reservation" because the term "Reservation" was derived from the label term "Flight Reservation" that is associated with the query node 220A. Similarly, the query node 222A is associated with the entity node 254A that includes the term "Ticket" because the term "Ticket" was derived from the label term "Ticket" that is associated with the query node 222A. The query node—entity node associations may be represented in the graph structure 212A by creating graph edges 260A, 262A, 264A that point from a particular query node to an associated entity node. For example, the association between the query node 220A and the entity node 250A may be represented in the graph structure 212A by creating a graph edge 260A from the query node 220A to the entity node 250A. Other graph edges such as graph edges 262A, 264A may be created in the same manner, as necessary.

Associating the values 232A, 234A with one or more entity nodes 250A, 252A, 254A may include propagating the values 232A, 234A to one or more entity nodes 250A, 252A, 254 based on the predetermined query node—entity node associations established by the generated query graph 212A. For instance, the value 232 "800" may be propagated from the query node 220A to the entity node 250A using the edge 260A. After propagation of the value 232 "800" from the query node 220A to the entity node 250A based on the relationship established by the graph edge 260A, the value "800" becomes associated with the entity node 250A as shown by element 270A. The values 232A, 234A may be propagated through the graph structure 212A in the same manner based on established graph structure edges 262A, 264A. Elements 270A, 272A, 274A are grayed out in FIG. 2A because the elements 270A, 272A, 274 A were not associated with the respective entity nodes 270A, 272A, 274A until after propagation of the values 232A, 234A through the graph structure 212A based on the established graph edges 260A. In some implementations, the values 232A "800" and 243A "500" need not be actively propagated or assigned to the respective entity nodes 250A, 252A, 254A. For instance, in some implementations, generation of the graph edges 260A, 262A, 264A may be sufficient to associate the values 232A "800" and 242A "500" with their respective entity nodes.

In a similar manner, the label terms associated with each respective query node 220A, 222A may also be associated with the entity nodes 250A, 252A, 254A with which each respective query node is associated. For instance, the label term "Flight Reservation" may become associated with the related entity node 250A based on the graph edge between query node 220A and entity node 250A indicating that the query node 220A and the entity node 250A are related. The label term "Ticket" that is associated with the query node 222A may also be forward propagated through the graph structure 212A in a similar manner to the label term "Flight Reservation" described above.

The card trigger-term identification unit 210A may also access a query log that is associated with one or more applications such as an email application. The accessing of the query log may be performed to identify one or more candidate query terms which can be evaluated for use in expanding the trigger-terms associated with the grammar of a particular structured information card. By way of example, the card trigger-term identification unit 210A may obtain the candidate query term "Flight Ticket" 240A in order to evaluate the candidate query term "Flight Ticket" for potential inclusion in the grammar associated with a structured information card such the "Flight" structured information card 142A. The query term "Flight Ticket" may have been stored in a query log after the user of a user device such as user device 110 submitted the query "Flight Ticket" to search one or more emails using an interface for an electronic mailbox such as interface 111A prior to the inclusion of the term "Flight Ticket" in the grammar of the "Flight" structured information card.

A query node 240A may be generated in the graph structure 212A based on the candidate query term "Flight Ticket." The candidate query node 240A is shown in gray in FIG. 2A because the candidate query node 240A is not added to the graph structure 212A until after the candidate query term "Flight Ticket" is retrieved from a query log. The candidate query node 240A is associated with a candidate label term "Flight Ticket."

Figure 2B:
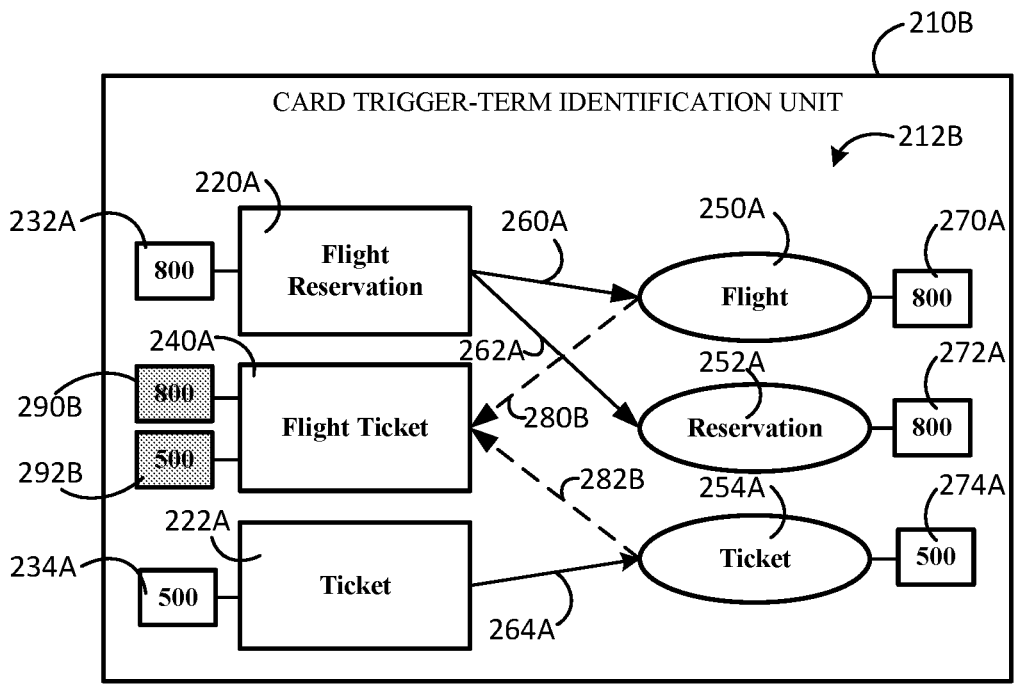
FIG. 2B is a contextual diagram of an example of additional aspects of a card trigger-term identification unit.

FIG. 2B is a contextual diagram of an example of additional aspects of a card trigger-term identification unit with reference to a card trigger-term identification unit 210B.

The card trigger-term identification unit 210B may continue to analyze the graph structure generated by the card trigger-term identification unit 210A in FIG. 2A. The card trigger-term identification unit 210B is the same card trigger-term identification unit 210A shown in FIG. 2A. The card trigger-term identification unit 210B is being described separately to show the additional operations performed at a subsequent stage of the card trigger-term identification unit's analysis of terms associated with the grammar of one or more structured information cards that begins where the description of FIG. 2A terminates.

The card trigger-term identification unit 210B may analyze the graph structure 212A to detect relationships that may exist between each respective entity node 250A, 252A, 254A and each respective candidate query node 240A. For example, the card trigger-term identification unit 210B may determine whether each respective entity node 250A, 252A, 254A is associated with a particular candidate query node 240A. In one implementation, an entity node may be associated with a particular candidate query node 240A if a term associated with an entity node is included in the label term of the candidate query node. For example, the entity node 250A is associated with the candidate query node 240A because the candidate label term "Flight Ticket" includes the word "Flight" that is associated with the entity node 250A. Similarly, for example, the entity node 254A is associated with the candidate query node 240A because the candidate label term "Flight Ticket" includes the term "Ticket" that is associated with the entity node 254A. Likewise, the entity node 252A is not associated with the candidate query node 240A because the candidate label term "Flight Ticket" does not include the term "Reservation" that is associated with the entity node 252A. However, other types of associations may exist between an entity node and a candidate query node. For example, where an entity node includes an email document, network address, URL, or the like, an entity node may be associated with a candidate query node if the candidate label term associated with the candidate query node would return the email document, network address, URL, or the like in response to a query that includes the candidate label term.

The card trigger-term identification unit 210B may modify the graph structure 212A to create the graph structure 212B. The card trigger-term identification unit 210B may modify the graph structure 212A by generating a graph edge that represents each relationship between an entity node and a candidate query node. The entity node—candidate query node relationships may be represented, for example, by a graph edge that points from a particular entity node to a particular candidate query node. For example, the card trigger-term identification unit 210B may create a graph edge 280B that points from the entity node 250A to the candidate query node 240A. The graph edge 280B may therefore represent the aforementioned relationship between the entity node 250A and the candidate query node 240A. Similarly, for example, the card trigger-term identification unit 210B may create a graph edge 282B that points from the entity node 254A to the candidate query node 240A. The card trigger-term identification unit 210B may generate other graph edges representing other relationships between entity nodes and candidate query terms, as necessary.

The card trigger-term identification unit 210B may associate entity node 250A, 252A, 254A values 270A, 272A, 274A with one or more candidate query nodes 240 using the generated graph edges that are based on relationships between the entity nodes and the candidate query nodes. Associating entity node values with the candidate query nodes may include, for example, propagating the entity node values to the candidate query node based on the established graph edges. By way of example, the entity node value 270A "800" becomes associated with the candidate query node 240A, as represented by the element 290B. Similarly, for example, the entity node value 274A "500" becomes associated with the candidate query node 240A, as represented by the element 292B. The elements 290B and 292B are grayed out because the elements 290B and 292B did not exist prior to the values "800" and "500" being associated with the candidate query node 240A based on the generated graph edges 280B, 282B. In some implementations, the values 270A "800" and 274 "500" need not be actively propagated or assigned to the candidate query node 240A. For instance, in some implementations, generation of the graph edges 280B, 282B may be sufficient to associate the values 270A and 274A with the candidate query node 240A.

In a similar manner, the label terms associated with each respective entity node 250A, 252A, 254A, as described with reference to FIG. 2A, may also be associated with one or more candidate query nodes 240A with which each respective entity node is associated. For instance, the label term "Flight Reservation" which was associated with the entity node 250A based on the graph edge 260A may become associated with the candidate query node 240A based on the graph edge 280B generated between entity node 250A and candidate query node 240A indicating that the entity node 250A and the candidate query node 240A are related. Other label terms such as the label term "Ticket" may also become associated with the candidate query node 240A based on other generated edges of the graph structure 212B.

After the values 290B "800" and 292B "500" are associated with the candidate query node 240A, the card trigger-term identification unit 210B may determine, based on values 290B "800" and 292B "500" whether the label term "Flight Ticket" associated with the candidate query node 240A should be added to the grammar of a structured information card such as the "Flight" structured information card. Determining whether the label term "Flight Ticket" should be associated with the grammar of a structured information card may include aggregating the values 290B "800" and 292B "500," and evaluating the aggregated value against a predetermined threshold. If it is determined that the aggregated value such as "1300" (e.g., 800+500=1300) satisfies a predetermined threshold, the label term "Flight Ticket" may be added to the grammar of the structured information card such as the "Flight" structured information card. If, however, the aggregated value such as "1300" does not satisfy a predetermined threshold, the label term "Flight Ticket" is not added to the grammar of the structured information card.

In some implementations, the generated graph structure 212B may be used to trigger the generation of a structured information card without updating the grammar of a structured information card. For instance, a query that includes a query term such as "Flight Ticket" that is not originally associated with the grammar 154A of a structured information card may be received by a server 120 prior to updating of the "Flight" structured information card's grammar 154A. Then, the process described with respect to FIG. 2A and FIG. 2B may be performed in order to associate the values 290B "800" and 292B "500" with a candidate query node associated with the candidate label term "Flight Ticket." Next, the values 290B "800" and 292B "500" may be aggregated to obtain an aggregated value of "1300." Finally, as described above, it may be determined whether the aggregated value of "1300" satisfies a predetermined threshold. If the aggregated value satisfies the predetermined threshold, the received query that includes the term "Flight Ticket" may be re-written so that the query including the term "Flight Ticket" which is not found in the grammar 154A of the "Flight" structured information card triggers the selection, population, and display of the "Flight" structured information card 142A without updating the "Flight" structured information card's grammar 154A. Re-writing the query may include, for example, adding one or more of the label terms to the query that became associated with the candidate label term "Flight Ticket" via the construction of the graph structure 212B. For example, rewriting the query may include adding the label term "Flight Reservation" to the query. Then, executing the rewritten query, which now includes a term found in the grammar 154A of the "Flight"

structured information card (e.g., "Flight Reservation"), will result in the "Flight" structured information card being selected, populated, and provided for display. If the aggregated value calculated based on the values 290B "800" and 292B "500" does not satisfy the predetermined threshold, then the received query with the term "Flight Ticket" will not be re-written, and will not trigger selection, population, and display of the "Flight" structured information card.

Though the examples provided above describe scenarios where the grammar would be updated or a received query may be re-written, the present disclosure need not be so limited. For example, it is also contemplated that there may be scenarios that fall within the scope of the present disclosure where the grammar may be updated to include an additional trigger-word and the received query be rewritten during the processing of a received query.

The aforementioned aggregation of values 290B "800" and 292B "500" have been described in the context of a simple addition operation. Other types of aggregation methods may be employed. For example, the values 290B "800" and 292B "500" may be multiplied. Alternatively, some form of weight sum of the values 290B "800" and 292B "500" may be calculated, and result used as the aggregated value.

Figure 3:
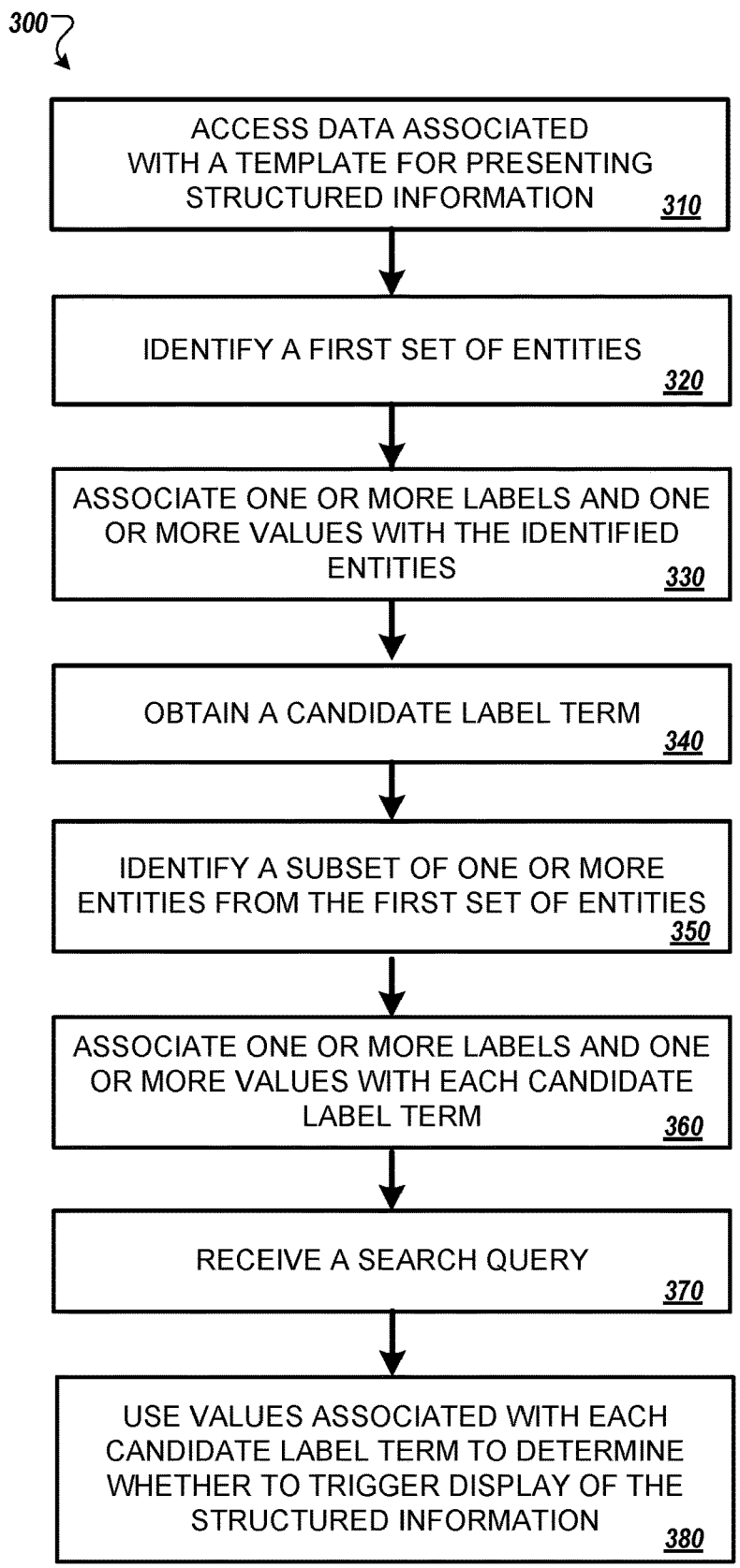
FIG. 3 is a flowchart of an example of a process for identifying an additional trigger-term for a structured information card.

FIG. 3 is a flowchart of an example of a process 300 for identifying an additional trigger-term for a structured information card. Generally, the process 300 may include accessing data associated with a template for presenting structured information 310, identifying a first set of one or more entities 320, associating one or more labels and one or more values with one or more entities in the first set of the identified entities 330, obtaining a candidate label term 340, identifying a subset of one or more entities from the first set of entities 350, associating one or more labels and one or more values with one or more candidate label terms 360, receiving a search query 370, and using values associated with each candidate label term to determine whether to trigger display of the structured information 380. The process 300 will be described below as being performed by a system such as system 100. The system may include one or more computers.

In more detail, the process 300 begins at stage 310 with a system accessing data associated with a template for presenting structured information. The accessing stage 310 may include, for example, a system accessing data that is maintained in a graph structure that includes one or more query nodes and one or more entity nodes. The accessed data may include data such as one or more label terms that are each associated with at least one query node. The one or more label terms may reference data that, when included in a search query, triggers presentation of a structured information card that includes structured information. The structured information may be based on, for example, a template that is associated with the structured information card.

Each of the one or more label terms may be associated with a value. The value may include, for example, an access count that is indicative of the number of times the one or more label terms have been used to trigger display of a structured information card. In some implementations, the value may be scaled using a scaling factor that can increase the weight associated with the value or decrease the weight associated with the value based on the importance of the one or more label terms with which the value is associated.

The process 300 may continue at stage 320 by with the system identifying a first set of entities that are associated with the one or more label terms. The identified entities in the first set of entities may include one or more entities that each include an item of data that is related to the one or more label terms. For example, the set of one or more entities may include an item of data that has a semantic relationship to one or more of the label terms. For example, the combined set of terms represented by each of the identified entities may include a set of all of the one or more label terms. Though this example describes entity nodes that are generated based on a set of shared words, the present disclosure need not be so limited. For instance, a particular entity in the first set of entities may include other item(s) of data that are representative of other relationships with one or more label terms associated with query nodes. For instance, each respective entity may be indicative of a particular email that is retrieved in response to the execution of a query that includes the one or more label terms. Alternatively, or in addition, a respective entity may be indicative of a particular web address, website, URL, or the like that that is returned in response to a query that includes the one or more label terms.

At stage 330, the system can associate one or more labels that are associated with one or more respective query nodes with one or more entities. Associating one or more labels with one or more entities may include assigning a query node's label terms to each entity to which the query node is associated. For example, assume a query node is associated with the label "Flight Reservation." In such an example, the label "Flight Reservation" may be assigned to the entity "Flight" and the label "Flight Reservation" may also be assigned to the entity "Reservation." Alternatively, or in addition, the system can also associate one or more values that are associated with a query node with one or more entities with which the query node is related. Associating one or more values that are associated with a query node with one or more entities may include propagating the values from the query node to each entity that the query node is related to. Propagation of one or more label terms, one or more values, or both from a query node to an entity may be referred to as forward propagation of label terms, forward propagation of values, or both. The propagation of label terms, values, or the like need not require physical copying of information such as a label term or a value from a first data structure to another data structure. Instead, propagation of information such as a label term or a value may be implied as a result of generating a graph edge between two or more nodes of a graph structure.

At stage 340, the system can obtain a candidate label term. The candidate label term may include one or more terms of a query that were received by an application. The candidate label term may be a term that the system evaluates for potential inclusion in the grammar of a structured information card. Alternatively, or in addition, the candidate label term may be a term that the system evaluates to determine whether a query should be rewritten to trigger a structured information card.

The system can analyze the relationships that exist between one or more entities and the obtained candidate label terms. The system performs this analysis to identify, at stage 350, a subset of one or more entities from the first set of entities that are related to the candidate label term. An entity may be related to the obtained candidate label term if a term associated with an entity is included in the candidate label term. However, other types of associations may exist between an entity node and a candidate label term. For example, where an entity includes an email document, network address, URL, or the like, an entity may be associated with a candidate label term if the candidate label term would return the email document, network address, URL, or the like when a query that includes the candidate label term is executed.

At stage 360, the system may associate one or more labels and one or more values with each candidate label term. For example, any label terms associated with a particular entity at stage 330 may be associated with a candidate label term with which the entity is related. Thus, in some implementations, a label term that was propagated to a particular entity from a query node may be further propagated from the entity to a candidate label term with which the particular entity is related. One or more values associated with an entity may similarly be associated with one or more candidate label terms with which the entity is related. Accordingly, in some implementations, a value that was propagated to a particular entity from a query node may be further propagated to a candidate label term. Propagation of one or more labels and one or more values from an entity to a candidate label term may be referred to as backward propagation of labels, backward propagation of values, or both. The propagation of label terms, values, or the like need not require physical copying of information such as a label term or a value from a first data structure to another data structure. Instead, propagation of information such as a label term or a value may be implied as a result of generating a graph edge between two or more nodes of a graph structure.

In some implementations, the system may analyze each of the one or more values that are associated with a candidate label term to determine whether the candidate label term should be added to the grammar associated with a structured information card. Determining whether a label term should be associated with a structured information card may include aggregating the values associated with the candidate label term, and evaluating the aggregated value against a predetermined threshold. If it is determined that the aggregated value satisfies a predetermined threshold, the label term may be added to the grammar of the structured information card. If, however, the aggregated value does not satisfy a predetermined threshold, the label term is not added to the grammar of the structured information card.

In other implementations, the system may receive a search query that includes a candidate label term at stage 370. At stage 380, the system may process the received search query, and use values associated with each identified candidate label term to determine whether to trigger display of a structured information card. Using the values associated with each candidate label term may include, for example, aggregating the one or more values that are associated with the candidate label term, and evaluating the aggregated value against a predetermined threshold. If it is determined that the aggregated value associated with the candidate label term satisfies the predetermined threshold, the system may determine that the search query including the candidate label term will trigger the presentation of a related structured information card. Alternatively, if it is determined that the aggregated value does not satisfy the predetermined threshold, the system may determine that the search query including the candidate label term will not trigger the presentation of a related structured information card.

In more detail, the process at stage 380 may be performed after the receipt of a search query and include rewriting the received search query in an effort to trigger the generation of a structured information card without updating the grammar of a structured information card. For instance, a query may be received that includes a candidate query term that is not included in the grammar of a structured information card. Then, the process described with respect to FIG. 2A and FIG. 2B may be performed in order to associate one or more values with the candidate query term. Next, an aggregated value of the one or more values may be calculated. Finally, it may be determined whether the aggregated value satisfies a predetermined threshold. If the aggregated value satisfies the predetermined threshold, the received query that includes candidate query term not found in the grammar of a structured information card may be re-written to include a term that is found in the grammar of a structured information card that is related to the query. The term that is added to the query may be based on one or more label terms that were propagated to the candidate label term from one or more query nodes when implementing the process described in FIGS. 2A and 2B. The re-written query may be executed, and then trigger the selection, population, and display of a related structured information card that is associated with a grammar that includes the term added to the query during re-writing. If the aggregated value does not satisfy the predetermined threshold, then the received query with the term that is not included in the grammar of a structured information card will not be re-written, and will not trigger selection, population, and display of a structured information card.

Figure 4:
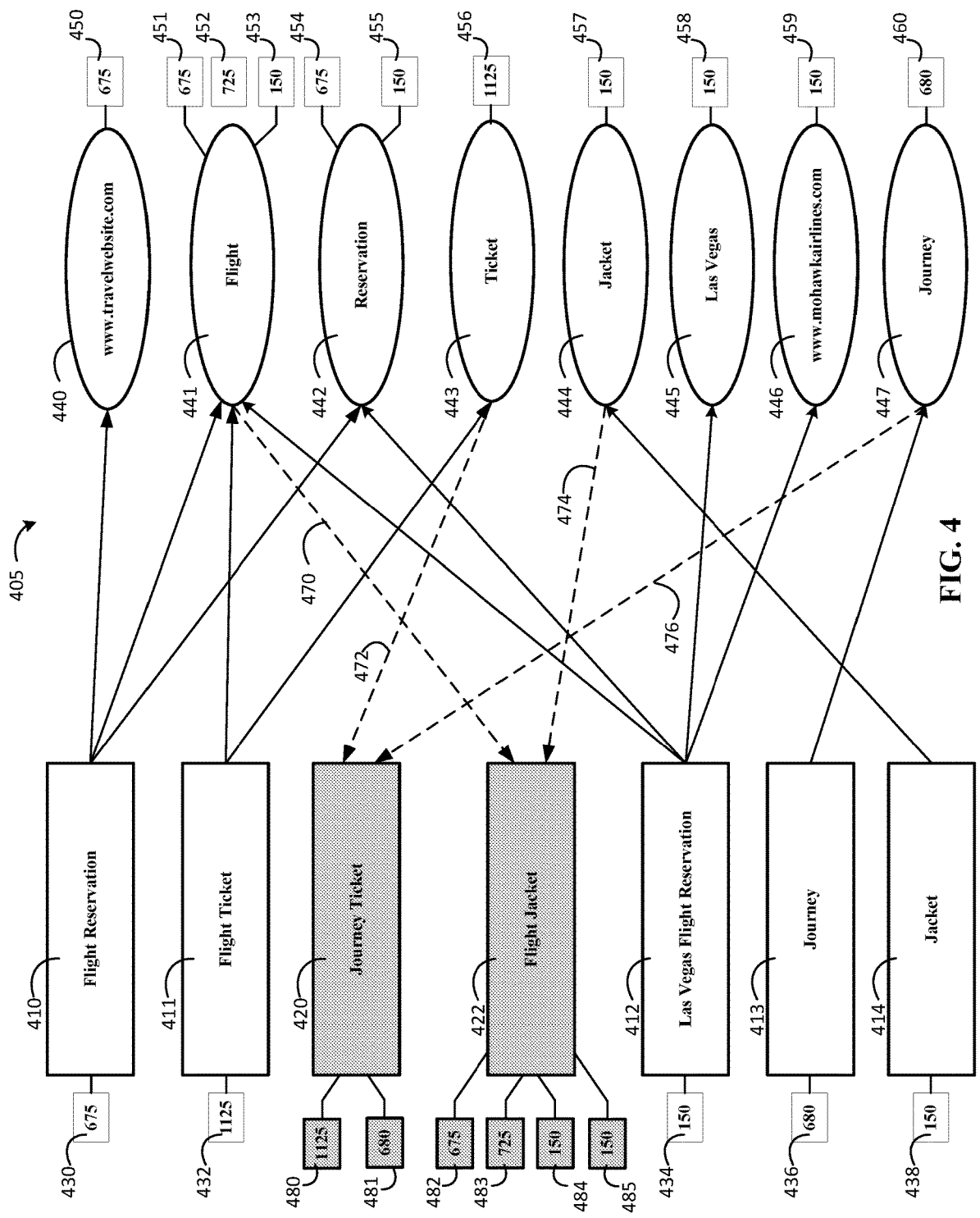
FIG. 4 is a contextual diagram of an example of a card trigger-term identification unit.

FIG. 4 is a contextual diagram of an example of a card trigger-term identification unit.

A card trigger-term identification unit may generate a graph structure 405. The graph structure 405 may include multiple query nodes such as query nodes 410, 411, 412, 413, 414. The query nodes 410, 411, 412, 413, 414 are each associated with a respective label term. For example, the query node 410 is associated with the label term "Flight Reservation," the query node 411 is associated with the label term "Flight Ticket," the query node 412 is associated with the label term "Las Vegas Flight Reservation," the query node 413 is associated with the label term "Journey," and the query node 414 is associated with the label term "Jacket." The query nodes 410, 411, 412, 413, 414 may be related to one or more entity nodes such as entity nodes 440, 441, 442, 443, 444, 445, 446, 447. One or more of the entity nodes may correspond to one or more terms from a set of multiple terms that are shared amongst the label terms of the query nodes 410, 411, 412, 413, 414. Other entity nodes may correspond to entities other than one or more shared terms. For example, the entity 440 may correspond to a website that is generated in response to the execution of query such as "Flight Reservation."

The graph structure 405 may also include one or more candidate query nodes 420, 422. The candidate query nodes 420, 422 may be based on query terms that were obtained from a query log. For example, the candidate query node 420 may be based the candidate label term "Journey Ticket" that was obtained from a query log. Similarly, the candidate query node 422 may be based on a candidate label term "Flight Jacket" that was obtained from a query log.

The graph edges from query nodes to entity nodes and the graph edges from entity nodes to candidate query nodes may be generated using the process described with respect to FIGS. 2A, 2B, and 3. Similarly, the value 430 "675," the value 432 "1125," the value 434 "150," the value 436 "680," and the value 438 "150" may be forward propagated based on graph edges, and then be associated with one or more entity nodes as depicted with reference to entity values 450, 451, 452, 453, 454, 455, 456, 457, 458, 459, 460 using the process described with respect to FIGS. 2A, 2B, and 3. Similarly, the entity values 450, 451, 452, 453, 454, 455, 456, 457, 458, 459, 460 may be backward propagated from the entity nodes to one or more candidate query nodes using generated graph edges such as 470, 472, 474, 476. Label terms associated with each respective query node may also be propagated through the graph structure from the respective query nodes to the candidate label terms using the generated graph edges.

The forward and backward propagation of label terms and values results in the generated graph structure 405. The candidate query node 420 may be associated with one or more values 480 "1125" and 481 "680." In addition, the candidate query node 420 is also associated with the label terms from query node 411 and query node 413 via the one or more graph edges that run from the query nodes 411, 413 to the candidate query node 420 through one or more respective entity nodes. Accordingly, the candidate query node 420 is also associated with the label terms "Flight Ticket" and "Journey." Other candidate query nodes such as candidate query node 422 may also be associated with one or more values and one or more label terms in the same manner as candidate query node 420.

The data in the graph structure 405 may be analyzed to determine whether one or more of the candidate query nodes 420, 422 are associated with a label term that, when included in a query, should trigger the selection, population, and display of a structured information card. With reference to FIG. 4, for example, the data in the graph structure may be analyzed to determine whether one or more of the candidate query nodes 420, 422 are associated with a candidate label term that, when received in a search query, can result in the selection, population, and display of a "Flight" structured information card.

The card trigger-term identification unit may aggregate the values 480 "1125" and 481 "680" associated with the candidate query term 420 to achieve an aggregated value of "1,805." Similarly, the card trigger-term identification unit may aggregate the values 482 "675," 483 "725," 484 "150," and 485 "150" associated with the candidate query term 422 to achieve an aggregated value of "1700."

With further reference to the example of FIG. 4, a predetermined threshold may be established that can be used to determine whether or not the label terms associated with the candidate query nodes 420, 422 should be used to trigger the display of the "Flight" structured information card. For example, if the aggregated value satisfies the predetermined threshold, then the label term associated with the query node will be used to trigger display of the "Flight" structured information card. Alternatively, however, for example, if the aggregated value does not satisfy the predetermined threshold, then the label term associated with the query node will not be used to trigger display of the "Flight" structured information card.

By way of example, assume a predetermined threshold that is set to "1750." The candidate query node 420 that is associated with the candidate label term "Journey Ticket" is associated with an aggregated value of "1805" which exceeds the predetermined threshold of "1750." However, a query with the candidate label term "Flight Jacket," on the other hand, is associated with an aggregated value of "1700" that falls below the predetermined threshold of "1750." Accordingly, received queries that include the label term "Journey Ticket" will trigger the selection, population, and display of the "Flight" structured information card as the aggregated value associated with "Journey Ticket" satisfies the predetermined threshold. However, received queries that include the term "Flight Jacket" will not trigger the selection, population, and display of the "Flight" structured information card as the aggregated value associated with "Flight Jacket" does not satisfy the predetermined threshold.

For situations in which the systems discussed here collect personal information about users, or may make use of personal information, the users may be provided with an opportunity to control whether programs or features collect personal information (e.g., information about a user's social network, social actions or activities, emails, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

The graph structures described in this specification can be represented by any of a variety of convenient physical data structures. For example, the graph can be represented by triples that each represent two entities in order and a relationship from the first to the second entity; for example, [alpha, beta, is the father of], or [alpha, is the father of, beta], are alternative ways of representing the same fact. Each entity and each relationship can be and generally will be included in multiple triples. By way of example to the subject matter described by this disclosure, a triple can be used to describe the relationship between a query node, an entity node, and a value that is associated with the edge between the query node and the entity node.

Alternatively, each entity can be stored as a node once, as a record or an object, for example, and linked through a linked list data structure to all the relationships the entity has and all the other entities to which the entity is related. More specifically, the graph can be stored as an adjacency list in which the adjacency information includes relationship information.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A computer-implemented method comprising:
receiving, from a user of a client device, a search query, the search query including one or more terms;
determining, based on the one or more terms of the search query, that a structured information card is responsive to the search query;
in response to determining that the structured information card is responsive to the search query, identifying one or more fields associated with the structured information card;
identifying a plurality of electronic communications sent to the user that are responsive to the search query and responsive to the one or more identified fields;
ranking the plurality of electronic communications sent to the user based on one or more criteria;
selecting, based on the ranking, a given electronic communication of the plurality of electronic communications;
populating, based on the one or more identified fields, the structured information card with information from the given electronic communication sent to the user; and
providing, for presentation to the user via a user interface of the client device, a search results page that includes:
(i) an indication of one or more additional electronic communications of the plurality of electronic communications, and
(ii) the structured information card, wherein the structured information card is presented adjacent to the one or more additional electronic communications.

2. The method of claim 1, wherein the one or more criteria utilized in ranking the plurality of electronic communications comprises at least a recency criteria.

3. The method of claim 2, wherein selecting the given electronic communication selected based on the recency criteria comprises selecting an electronic communication most recently sent to the user.

4. The method of claim 1, wherein the one or more criteria utilized in ranking the plurality of electronic communications comprises at least a temporal criteria.

5. The method of claim 4, wherein selecting the given electronic communication selected based on the temporal criteria comprises selecting an electronic communication sent to the user associated with a next upcoming event.

6. The method of claim 1, wherein the user interface of the client device is an electronic mailbox interface, and wherein the search query is received via the electronic mailbox interface of the client device.

7. The method of claim 1, wherein the user interface of the client device is a search interface, wherein the search query is received via the search interface of the client device, and wherein the search results page also include search results that are responsive to the search query and that are in addition to the structured information card.

8. The method of claim 7, wherein the structured information card is displayed on the search interface at a location other than a location where the search results are displayed, and at a location other than a field where the search query is received.

9. A system comprising:
at least one processor; and
at least one memory storing instructions that, when executed, cause the at least one processor to:
receive, from a user of a client device, a search query, the search query including one or more terms;
determine, based on the one or more terms of the search query, that a structured information card is responsive to the search query;
in response to determining that the structured information card is responsive to the search query, identify one or more fields associated with the structured information card;
identify a plurality of electronic communications sent to the user that are responsive to the search query and responsive to the one or more identified fields;
rank the plurality of electronic communications sent to the user based on one or more criteria;
select, based on the ranking, a given electronic communication of the plurality of electronic communications;
populate, based on the one or more identified fields, the structured information card with information from the given electronic communication sent to the user; and
provide, for presentation to the user via a user interface of the client device, a search results page that includes:
(i) an indication of one or more additional electronic communications of the plurality of electronic communications, and
(ii) the structured information card, wherein the structured information card is presented adjacent to the one or more additional electronic communications.

10. The system of claim 9, wherein the one or more criteria utilized in ranking the plurality of electronic communications comprises at least a recency criteria.

11. The system of claim 10, wherein selecting the given electronic communication selected based on the recency criteria comprises selecting an electronic communication most recently sent to the user.

12. The system of claim 9, wherein the one or more criteria utilized in ranking the plurality of electronic communications comprises at least a temporal criteria.

13. The system of claim 12, wherein selecting the given electronic communication selected based on the temporal criteria comprises selecting an electronic communication sent to the user associated with a next upcoming event.

14. The system of claim 9, wherein the user interface of the client device is an electronic mailbox interface, and wherein the search query is received via the electronic mailbox interface of the client device.

15. The system of claim 9, wherein the user interface of the client device is a search interface, wherein the search query is received via the search interface of the client device, and wherein the search results page also include search results that are responsive to the search query and that are in addition to the structured information card.

16. The system of claim 15, wherein the structured information card is displayed on the search interface at a location other than a location where the search results are displayed, and at a location other than a field where the search query is received.

17. A non-transitory computer-readable storage medium storing instructions that, when executed, cause at least one processor to perform operations, the operations comprising:
- receiving, from a user of a client device, a search query, the search query including one or more terms;
- determining, based on the one or more terms of the search query, that a structured information card is responsive to the search query;
- in response to determining that the structured information card is responsive to the search query, identifying one or more fields associated with the structured information card;
- identifying a plurality of electronic communications sent to the user that are responsive to the search query and responsive to the one or more identified fields;
- ranking the plurality of electronic communications sent to the user based on one or more criteria;
- selecting, based on the ranking, a given electronic communication of the plurality of electronic communications;
- populating, based on the one or more identified fields, the structured information card with information from the given electronic communication sent to the user; and
- providing, for presentation to the user via a user interface of the client device, a search results page that includes:
  (i) an indication of one or more additional electronic communications of the plurality of electronic communications, and
  (ii) the structured information card, wherein the structured information card is presented adjacent to the one or more additional electronic communications.

* * * * *